July 6, 1926.
H. J. LEBHERZ
SIPHON FILTER
Filed Nov. 20, 1925
1,591,923
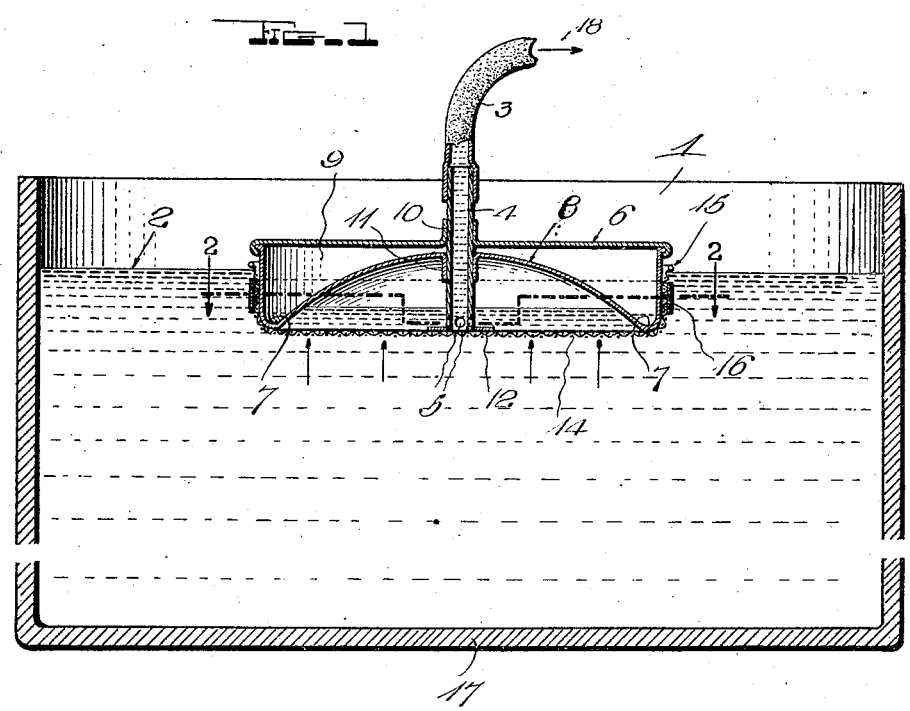
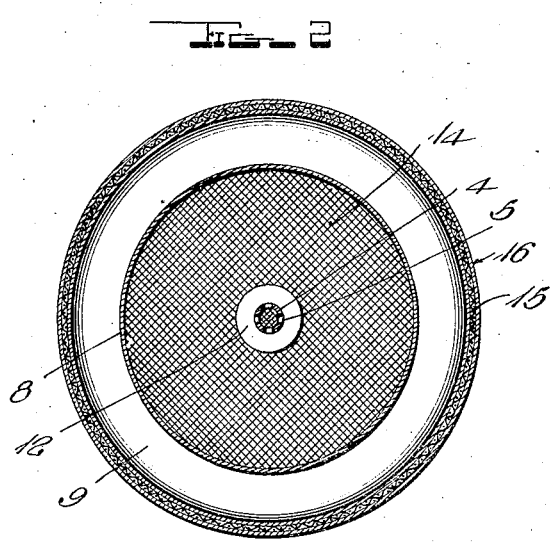
INVENTOR.
Harry J. Lebherz,
BY
John O. Brady
ATTORNEY.

Patented July 6, 1926.

1,591,923

UNITED STATES PATENT OFFICE.

HARRY J. LEBHERZ, OF FREDERICK, MARYLAND, ASSIGNOR TO THE EVEREDY COMPANY, OF FREDERICK, MARYLAND, A CORPORATION OF MARYLAND.

SIPHON FILTER.

Application filed November 20, 1925. Serial No. 70,287.

My invention relates broadly to filtering apparatus and more particularly to the construction of a siphon filter.

One of the objects of my invention is to provide a construction of combined float and filtering device which may be used in the transfer of liquids by a siphoning action.

Another object of my invention is to provide a combined siphon filter and float for liquids in which the filtering medium may be formed below a surface of the float with means for maintaining the filter surface at a fixed distance from the lower surface of the float for preventing any obstruction to the filtering action of the float.

Still another object of my invention is to provide a dome shaped metallic float having means for stretching a filtering cloth over the under surface thereof in a plane which is substantially chordal with respect to the under surface of the float and supported centrally thereof for preventing distortion of the filtering surface in the process of the siphoning action, when the pressure beneath the dome shaped surface of the float is reduced.

My invention will be more clearly understood from the following specification by reference to the accompanying drawings, wherein:

Figure 1 is a cross-sectional view taken through my combined siphon filter and float and showing the arrangement of the dome-shaped head on the float by which the filtering surface is at all times spaced away from the under side of the float; and Fig. 2 is a cross-sectional view through the combined filter and float taken on line 2—2 of Fig. 1.

Referring to the drawings in detail, reference character 1 represents a tank in which the fluid 2 which is to be filtered is contained. A flexible tube 3 is provided through which the filtered fluid is drawn through a short tube 4 provided with apertures 5 at the lower end thereof and with an annular flange 12 which lies in a plane coincident with the plane of the peripheral edge 7 of the float 6. The float 6 has a dome-shaped under surface 8 with an annular boss 11 which forms a tight joint with the circular walls of the tube 4. The top of the float 6 has a boss 10, the annular walls of which form a tight joint with another portion of the cylindrical tube 4. The walls 6 and 8 of the float are spaced from each other as represented at 9 forming a buoyant body which tends to remain on the surface of the liquid 2. A filter surface 14 is stretched over the lower portion of the dome-shaped float and is secured thereover by means of a ring-shaped member 16 which binds the side portions 15 of the filter cloth against the side walls of the float. The center of the filter cloth is supported by means of the flat annular flange 12 on the extremity of the tube 4. In this manner the filter cloth is prevented from being sucked up against the under side of the float and impairing the filtering action of the float.

It will be observed that the filter remains on the surface of the liquid and that after a vacuum is once established within the space below the dome-shaped head 8, the liquid begins to flow through the filter cloth 14, apertures 5, short tube 4, and flexible tube 3 in the direction of arrow 18. The fluid will continue to flow until the float goes to the bottom 17 of the receptacle 1 and the first air seeps in through the filter cloth 14 breaking the vacuum. The apertures 5 in the tube 4 extend to the bottom level of the float which enables the filter to pick up the smallest quantity of liquid which may remain in the receptacle 1. I have constructed the siphon filter with a dome-shaped under surface 8 for I find that there is less tendency for the filter cloth 14 to be dragged against the under surface of the float during the process of siphoning fluid which may contain relatively heavy solids. The liquid which is drawn through the tube 3 is clear of sediment or other undesired particles.

While I have shown my invention in a certain preferred embodiment, I desire that it be understood that modifications may be made and that no limitations upon the invention are intended other than those imposed by the scope of the appended claims.

What I claim and desire to secure by Letters Patent of the United States is as follows:—

1. In a combined siphon filter and float, the combination of a floatable metallic body, said body having a dome-shaped under surface, a central tubular member depending from said body, a filter surface supported from the peripheral edges of said body and centrally supported by said tubular member and a flexible tubular connection with said tubular member whereby fluid may be drawn upwardly through said tubular member and under said dome-shaped surface for siphoning while said body floats on the surface thereof.

2. In a combined siphon filter and float, the combination of a floatable metallic body, a dome-shaped under surface for said body, a tubular member projecting downwardly from the center of said body and having a flat flange thereon, said flange extending in a plane co-incident with the peripheral edges of said dome-shaped body, a filter surface supported between said flange and the peripheral edges of said body, and a flexible connection with said tubular member whereby suction may be set up beneath said dome-shaped surface for drawing liquid through said filter surface and said tubular member, while said body floats on the surface of the liquid.

3. In a combined siphon filter and float, the combination of a floatable body structure, said body structure having a dome-shaped under surface with an annular peripheral edge on said surface, a central tubular member depending from said body structure and having a flat annular flange thereon extending in a plane which passes through the peripheral edge of said body structure, a filter cloth arranged to be stretched across the peripheral edges of said body structure and supported centrally by said flat annular flange and a flexible connection to said tubular member whereby fluid may be siphoned through said filter cloth while said body structure floats on the surface of the fluid.

4. In a combined siphon filter and float, the combination of a floatable body structure, said body structure having a dome-shaped under surface with an annular peripheral edge on said surface, a central tubular member depending from said body structure and having a flat annular flange at one end and a discharge outlet at the opposite end, a filter surface supported on said peripheral edge and by the flange of said central tubular member, whereby fluid may be siphoned through said filter surface and said tubular member and passed through said discharge outlet, while said body structure floats on the surface of the fluid.

5. In a combined siphon filter and float the combination of a floatable body structure, said body structure having a dome-shaped under surface, a tubular member disposed centrally within said body structure and having its side walls apertured at points below said dome-shaped surface, a flat annular flange carried by one end of said tubular member and a discharge outlet positioned at the opposite end of said tubular member, said flat annular flange extending in a plane which passes through the lower peripheral edge of said body structure, a filter cloth arranged to be stretched across the peripheral edge of said body structure, a ring member arranged to be telescoped over the side walls of said body structure for retaining said filter cloth in stretched position over the peripheral edges of said body structure and centrally supported by said flat flange, whereby fluid may be siphoned through said filter cloth and through the apertured tubular member and passed through said discharge outlet while said body structure floats on the surface of the fluid.

6. A combined siphon filter and float comprising in combination a body structure having a dome-shaped under surface, a tubular member centrally positioned in said body structure and extending downwardly to a point beneath said dome-shaped under surface, a flat annular flange carried by the lower extremity of said tubular member, said tubular member being apertured at points immediately above said flat annular flange, said flange being disposed in a plane which passes through the peripheral edges of said body structure, a filter cloth arranged to be stretched taut across said under surface in a plane which is substantially chordal to said dome-shaped surface and a flat band member arranged to be telescoped over the side walls of said body structure for securing said filter cloth in position whereby fluid may be siphoned through said filter cloth while said body structure floats on the surface of the fluid.

In testimony whereof I affix my signature.

HARRY J. LEBHERZ.